United States Patent

[11] 3,543,972

[72] Inventors Ary van der Lely
10 Weverskade, Massland;
Cornelis Johannes Gerardus Bom, 36,
Esdoornlaan, Rozenburg, Netherlands
[21] Appl. No. 717,282
[22] Filed March 29, 1968
[45] Patented Dec. 1, 1970
[32] Priority Feb. 1, 1968
[33] Netherlands
[31] No. 6801447

[54] TRANSPORTABLE LIQUID DISTRIBUTING DEVICES
11 Claims, 4 Drawing Figs.

[52] U.S. Cl. .................................................. 222/559
[51] Int. Cl. ...................................................... B65d 47/00
[50] Field of Search .......................................... 222/559-
—561, 505

[56] References Cited
UNITED STATES PATENTS

| | | | |
|---|---|---|---|
| 610,690 | 9/1898 | Ryder | 222/505X |
| 746,326 | 12/1903 | Hain | 222/505X |
| 1,057,769 | 4/1913 | Pearson | 222/561X |
| 1,360,805 | 11/1920 | Sherman et al. | 222/561X |
| 2,544,948 | 3/1951 | Caldwell | 222/559X |
| 2,479,347 | 8/1949 | Gotham | 222/505 |
| 3,270,921 | 9/1966 | Nadolske et al. | 222/561X |

FOREIGN PATENTS

| | | | |
|---|---|---|---|
| 6,502,788 | 9/1966 | Netherlands | 222/505 |

*Primary Examiner*—Samuel F. Coleman
*Attorney*—Mason, Mason, & Albright

ABSTRACT: A liquid spreader with a container has an opening which can be opened and closed by a sliding closing member. The closing member can be biased against a stop to be partly open. An actuating mechanism attached to the closing member can raise the member if the opening becomes clogged.

Patented Dec. 1, 1970
3,543,972
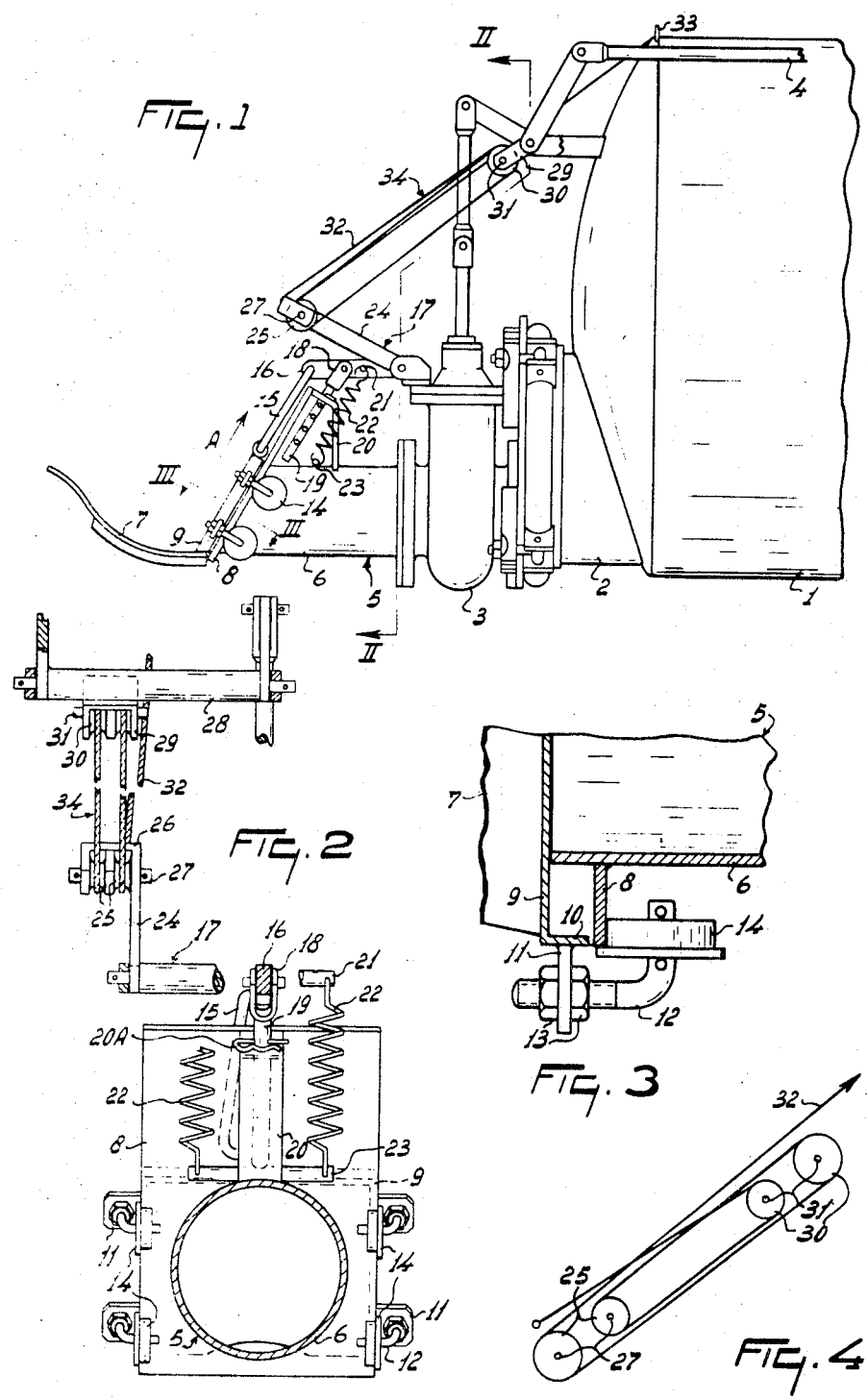
INVENTORS
ARY VAN DER LELY
CORNELIS JOHANNES GERARDUS BOM
BY
Mason, Mason & Albright
Attorneys

TRANSPORTABLE LIQUID DISTRIBUTING DEVICES

This invention relates to transportable liquid distributing devices.

According to the present invention there is provided a transportable device for distributing liquid under pressure, comprising a container, a spreading member, an adjustable closing member for throttling the spreading member to a selectable extent, and guide means supporting the closing member such as to offer a minimum of frictional resistance to adjusting movement of the closing member.

For a better understanding of the invention and to show how the same may be carried into effect, reference will now be made, by way of example, to the accompanying drawing, in which:

FIG. 1 is a side view of the rear part of a transportable liquid distributing device;

FIG. 2 is a sectional view, taken on the line II–II of FIG. 1 and on a larger scale, of the device part of FIG. 1;

FIG. 3 is a detail of the device part of FIGS. 1 and 2; and

FIG. 4 shows diagrammatically a pulley system for actuating a closing member of the device of FIGS. 1 to 3.

The transportable device for distributing liquid under pressure shown in the FIGS. includes a tank 1 which is provided at the rear with an outlet 2 accommodating a valve 3. The valve 3 can be actuated in known manner by means of a rod system 4 from the front of the device to open and close the outlet 2. The outlet 2 communicates with a spreading member 5 which consists of a rearwardly projecting, substantially horizontal pipe 6 whose end remote from the valve 3 is provided with a distributor plate 7. The end of the pipe 6 remote from the valve 3 is beveled in downward direction so that the upper part is located nearer the tank 1 than the lower part. The slanting end portion of the pipe 6 is surrounded by a plate 8 which has a hole receiving the pipe 6, and which extends from the pipe 6.

The pipe 6 supports a closing member 9 for throttling the spreading member 5. The closing member 9 is formed by a flat plate having bent over edge portions 10 that form upright sides. The portions 10 extend as far as into the proximity of the plate 8. On either side, each of the portions 10 is provided with an ear 11, which ears are spaced from each other and hold supports 12 by means of nuts 13 which cooperate with screw-threaded portions of the supports 12. The ends of the supports 12 remote from the ears 11 are bent over and form rotary shafts for rollers 14 which cooperate with the side of the plate 8 remote from the closing member 9. By means of rims provided on the rollers 14 a lateral boundary for the plate 8 is obtained as shown in FIGS. 2 and 3. The provision of the screw-threaded portions of the supports 12 enables the position of the rollers 14 relative to the closing member 9 to be varied in a direction substantially at right angles to the closing member 9 by adjusting the positions of the supports 12. From FIG. 2 it will be apparent that the rotary shafts of the rollers 14 extend approximately in a horizontal direction, the rotary axes of each pair of opposite rollers being in line with each other.

The upper edge of the closing member 9 is pivoted by means of a rod 15 to a lower arm 16 of a two-arm rocker 17. The rocker 17 is pivoted, at the base of its arms, to the upper end of the valve 3. Between the pivotal connection of the arm 16 with the closing member 9 and the pivotal support of the rocker 17 on the valve 3, a rod 19 is pivotally connected to the arm 16 by means of a fork-shaped part 18. The rod 19 is passed through a hole in a stop 20 extending between the plate 8 and the upper part of the pipe 6. The rod 19 has holes for receiving a spring pin 20A. The arm 16 of the rocker 17 is furthermore provided with a support 21 extending from either side of the arm 16 transversely of the arm 16 and provided near each of its ends with springs 22. The ends of the springs 22 remote from the support 21 are fastened to a support 23 on the upper part of the pipe 6, which support 23 extends parallel to the support 21.

The upper end of the upper arm 24 of the rocker 17 is provided near its free end with a pair of pulleys 25 disposed between the limbs of a U-shaped support 26 formed at the free end of the arm 24. The pulleys 25 rotate about a shaft 27. A support 28 for the rod system 4, by means of which the valve 3 can be actuated, is provided, with the aid of a U-shaped bracket 29, with a pair of adjacent pulleys 30. The pulleys 30 rotate about a shaft 31. The free end of the upper arm 24 of the rocker 17 is connected with a rope 32 which is passed, as is shown schematically in FIG. 4, around the pairs of pulleys 25, 30, and which extends via a guide member 33 towards the front of the device. In FIG. 4 one pulley of each pair is shown, for the sake of clarity, in a displaced position and on a smaller scale.

The device described above operates as follows:

When the tank 1 of the device is filled with the liquid to be spread by means of the valve 3 the outlet 2 can be closed. When the device has arrived at the field, the closing member 9 can be brought into a chosen position which corresponds with a defined opening and the valve 3 can be opened. When the opening clogs the closing member 9 is moved upwards in the direction of the arrow A (FIG. 1) by means of the control mechanism 34 which includes the pulley transmission described above. The rollers 14 running on the plate 8 form guide members for the closing member 9, providing a minimum of frictional resistance so that the closing member can be easily moved upwards in spite of the pressure exerted by the fluid on the closing member after it has commenced to move. After the closing member 9 has been moved upwards, and the opening is free again the springs 22 tend to pull back the closing member 9 into its initial position. This initial position can be adjusted by means of the spring pin 20A, which can be inserted into any one of the holes in the rod 19, cooperating with the stop 20. In this manner the extent to which the closing member 9 throttles the spreading member 5 can be selected and thereby the quantity of material to be distributed can be determined. In the event of clogging the closing member 9 can be readily moved upwards by means of the control mechanism 34 in the manner described above. With the construction described above, in which the closing member 9 is provided with a friction reducing mechanism so that it can be easily moved upwardly in spite of the high pressure exerted on it, only a small amount of energy is required to shift the closing member 9 upwards in operation. The pulley transmission provides furthermore a transmission requiring a minimum of energy for operation.

We claim:

1. A transportable device for distributing liquid under pressure, comprising a container, a spreading member with an outlet connected to said container, an adjustable closing member for throttling said outlet to a selectable extent, guide means associated with said closing member for positioning same relative to said outlet, said guide means being movable with said closing member with a minimum of frictional resistance, a stop being provided on said device to retain said closing member in a selected position, spring means associated with said closing member to bias same against said stop, said stop cooperating with a displaceable pin connected to said closing member, said displaceable pin cooperating with any one of a plurality of holes in a rod of said closing member, said rod being passed through a further hole in said stop.

2. A device as claimed in claim 1, wherein said guide means has rollers that rotate when said closing member is moved, said rollers being located on each side of said closing member.

3. A device as claimed in claim 2, wherein said rollers are carried by said closing member and bear on a guide element on said spreading member.

4. A device as claimed in claim 2, wherein said closing member is a slideable plate positioned adjacent the downstream side of the outlet on said spreading member and said rollers are secured to the outer face of said closing member.

5. A device as claimed in claim 2, wherein two spaced-apart rollers are provided on each side of said closing member.

6. A device as claimed in claim 5, wherein the distances of said rollers relative to the closing member can be varied by adjustable means.

7. A device as claimed in claim 6, wherein the positions of said rollers can be varied in a direction substantially at right angles to the closing member.

8. A device as claimed in claim 6, wherein said rollers are mounted on adjustable supports which are displaceable with respect to said closing member.

9. A device as claimed in claim 6, wherein the rotary axes of said rollers are arranged on both sides of said closing member in alinement with each other, said rotary axes of said rollers extending substantially horizontally.

10. A device as claimed in claim 1, wherein said closing member can be actuated by a control mechanism from the front of said device, said control mechanism including a pulley transmission located above said closing member and comprising four pulleys.

11. A device as claimed in claim 10, wherein said pulleys of said pulley transmission are disposed in spaced-apart pairs, one pair of pulleys being mounted on a rocker connected to said closing member and another pair of pulleys being secured to the frame of said device.